United States Patent [19]
Jackson

[11] Patent Number: 6,029,646
[45] Date of Patent: Feb. 29, 2000

[54] ADJUSTABLE OUTDOOR COOKING RACK

[76] Inventor: Milan D. Jackson, 3953 Brookside La., Boise, Id. 83703

[21] Appl. No.: 09/175,153

[22] Filed: Oct. 19, 1998

[51] Int. Cl.⁷ ...................................................... F24B 3/00
[52] U.S. Cl. .............................. 126/30; 126/9 B; 126/29; 126/25 A; 126/40
[58] Field of Search ............... 126/30, 9 B, 29, 126/25 A, 40; 99/446, 449, 450; 248/156

[56] References Cited

U.S. PATENT DOCUMENTS

| | | | |
|---|---|---|---|
| 670,144 | 3/1901 | Bond | 126/29 |
| 1,666,293 | 4/1928 | Lorton | 126/29 |
| 2,173,024 | 9/1939 | Park | 126/29 |
| 2,522,223 | 9/1950 | Hardin et al. | 248/124 |
| 2,604,884 | 7/1952 | Walker | 126/30 |
| 2,827,846 | 3/1958 | Karkling | 126/30 |
| 2,974,662 | 3/1961 | Forrest | 126/30 |
| 3,344,780 | 10/1967 | Anderson | 126/30 |
| 4,230,089 | 10/1980 | Barden | 126/30 |
| 4,363,313 | 12/1982 | Smith | 126/9 R |
| 4,607,608 | 8/1986 | Alfred et al. | 126/30 |
| 4,896,651 | 1/1990 | Kott, Jr. | 126/30 |
| 4,979,490 | 12/1990 | Nudo et al. | 126/30 |
| 5,355,867 | 10/1994 | Hall et al. | 126/30 |
| 5,666,940 | 9/1997 | Kreiter | 126/30 |
| 5,713,334 | 2/1998 | Gilbert | 126/29 |
| 5,848,584 | 12/1998 | Brog | 126/30 |

*Primary Examiner*—Larry Jones
*Attorney, Agent, or Firm*—Ken J. Pedersen; Barbara S. Pedersen

[57] ABSTRACT

The present invention is an outdoor cooking rack apparatus. The invented outdoor cooking rack apparatus comprises a grooved support post for support of cooking platforms, and a cooking platform for supporting a pot, grill or other device over a campfire. Additionally, the invented apparatus may also comprise a kettle hook attached to the apparatus for holding a kettle or other pot over a campfire. The cooking platforms contain a leveling bend in their attachment arm allowing them to hold pots and other utensils in a level position. Benefits of the invented cooking rack apparatus include: the ability to be vertically adjustable; the ability to receive a number of different cooking platforms; the ability to swing cooking platforms, within a horizontal plane, to the side or even rear of the apparatus; the ability to securely hold various cooking platforms in place; the ability to hold cooking platforms generally level and within a plane perpendicular to the support post; strength and durability; and setting up the apparatus requires no tools.

18 Claims, 13 Drawing Sheets

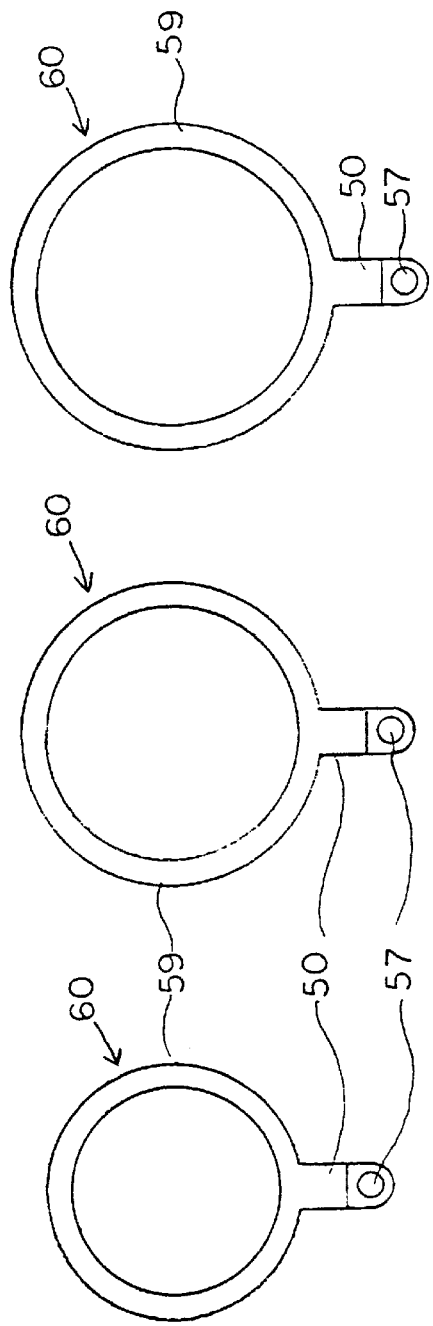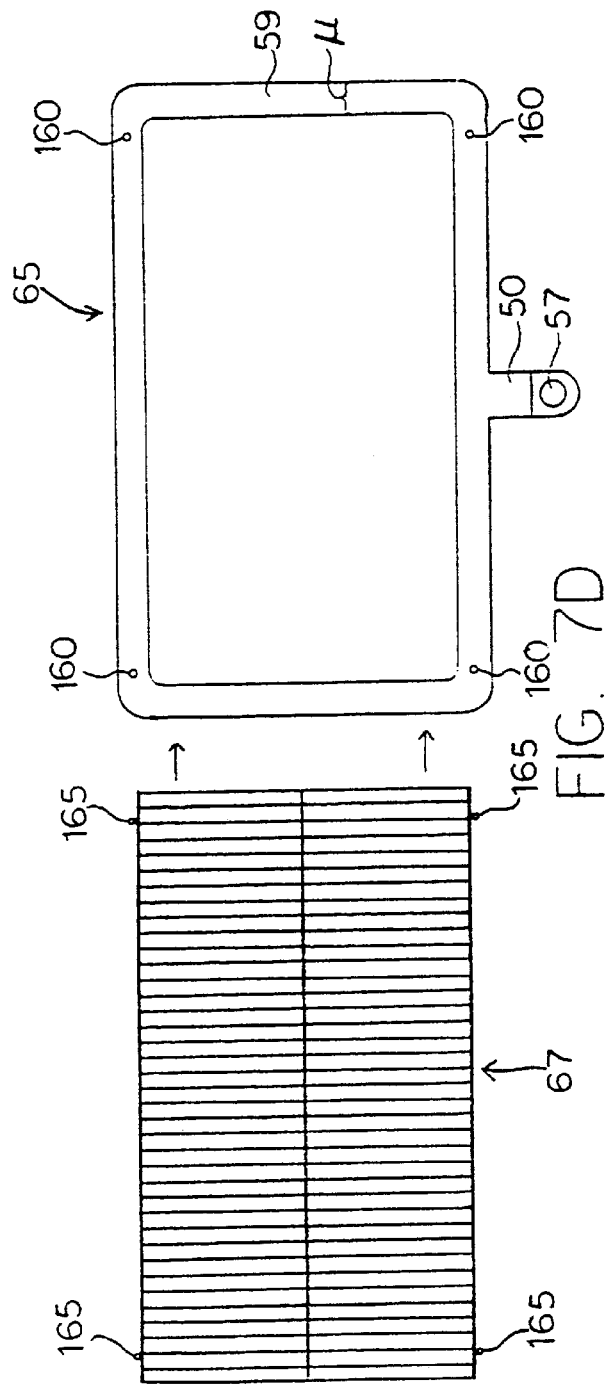

ADJUSTABLE OUTDOOR COOKING RACK

BACKGROUND OF THE INVENTION

1. Field of the Invention

This invention relates generally to outdoor camping equipment. More specifically, this invention relates to adjustable devices used to hold grills, pots, pans and other cooking containers over an outdoor cooking fire.

2. Related Art

Many different inventions are disclosed encompassing the field of devices for holding a container or a grill over an outdoor camping fire.

Some of these inventions comprise grills to be used over an outdoor campfire. U.S. Pat. No. 2,604,884 (Walker) discloses a barbecue and cooking stand. The Walker stand has only one grilling surface and does not allow the user to swing the grill out of the way.

U.S. Pat. No. 2,974,662 (Forrest) discloses an adjustable grill. The Forrest grill does not allow the user to swing, within a horizontal plane, the grills individually out of the way.

U.S. Pat. No. 3,344,780 (Anderson) discloses a portable grill device. However, the Anderson grill is not of a sturdy enough design to accommodate large, heavy items, such as kettles and pots.

U.S. Pat. No. 4,979,490 (Nudo et al.) discloses an adjustable post-mounted campfire grill. The Nudo grill does not disclose a grill apparatus for receiving more than one grill or pot platform.

U.S. Pat. No. 5,666,940 (Kreiter) discloses a post-supported barbecue assembly. The Kreiter barbecue, while adjustable, does not have functions allowing its grill to swing out of the way.

Two other patents disclose supports for holding cooking utensils over a campfire: U.S. Pat. No. 2,522,223 (Hardin, et al.), and U.S. Pat. No. 4,230,089 (Barden). The Barden support assembly, while adjustable, does not have the benefit of allowing its grill to swing out of the way. The Hardin cooking apparatus support, while adjustable and able to have the grill or other item held swung out of the way, does not have the durability or strength needed to support large or heavy objects, such as a large kettle.

The final item of related art that the Applicant and Applicant's Attorney are aware of was disclosed to the Applicant and the Applicant's Attorney by the draftsman hired to prepare the drawings enclosed with this patent application. This article of prior art is owned by the draftsman. Drawings of this item are depicted in FIGS. 1 and 2. We have examined this article, and it does not have any markings or numbers upon itself to allow us to determine its source. The item has an insertion hole which slides over a post. However, the post does not have notches or grooves, and the arm supporting the grill rack does not have a bend allowing the grill rack to rest in a horizontal position. The device itself is of a simple manufacture, comprising a $^{29}/_{32}$ inch rod being received into a $^{15}/_{16}$ inch hole and does not appear to be sturdy enough to withstand the weight of heavy kettles and other utensils. Viewing FIG. 2 in comparison to FIG. 3 illustrates the relative differences in size and structure of the prior art device in view of the invented device.

What is needed, and is not shown in the prior art, is an outdoor cooking rack which: is adjustable; allows the user to set grills and pot platforms at various heights above a fire; allows the user to swing grills and pot platforms, within a generally horizontal plane, individually away from the fire while keeping other grills and pot platforms above the fire; holds various grills and pot platforms in place; holds various grills and pot platforms generally level and within a plane perpendicular to the support post; is made of durable and sturdy materials, allowing the user of the rack to place items of great weight on the rack, such as a large Dutch oven or a kettle; and requires no tools to set-up the cooking rack.

SUMMARY OF THE INVENTION

The present invention is an outdoor cooking rack apparatus. The invented outdoor cooking rack apparatus comprises a grooved support post for support of cooking platforms, and a cooking platform for supporting a pot, grill or other device over a campfire. Additionally, the invented apparatus may also comprise a kettle hook attached to the apparatus for holding a kettle or other pot over a campfire.

A first benefit of the invented cooking rack apparatus is the ability to be vertically adjustable. For instance, the cooking rack apparatus can be maneuvered from a location closer to the campfire vertically to a position farther from the campfire. This is important in outdoor cooking, in that the closer a pot or grill is to the campfire, the greater the heat received by such pot or grill. The desired temperature for brewing a pot of coffee differs from the temperature required for keeping the pot of coffee warm, making vertical adjustment a necessity.

A second benefit of the invented cooking rack apparatus is the ability to receive a number of different cooking platforms. As such, the user is not limited to heating one item at a time over the campfire, but could instead have one thing on the grill, a couple of different pots above the grill, and perhaps even a coffee pot above the pots. This is similar to what is shown in FIG. 3. Such ability to have multiple uses at once greatly increases the utility of the invented apparatus.

A third benefit of the invented cooking rack apparatus is the ability to swing cooking platforms, within a horizontal plane, to the side or even rear of the apparatus. The cooking platforms can be swung 360 degrees horizontally in the invented apparatus. This benefit is especially useful where the user wishes to remove items on the grill or pots held within cooking platforms from the heat radiating from the campfire. The cooking platforms can even be slightly rotated to either side so as to allow for fine adjustment of heat received by the grill or pot platform. Such rotation can be done without moving the other cooking platforms being held over the campfire.

A fourth benefit of the invented cooking rack apparatus is the ability to securely hold various cooking platforms in place. The manner in which the support post cooperates with the cooking platforms provides for a very secure attachment, especially when the cooking platforms are further encumbered by the weight of a grill or pot. This attachment is created by the cooperation of rims on the cooking platforms with grooves cut within the support post.

A fifth benefit of the invented cooking rack apparatus is holding cooking platforms generally level and within a plane perpendicular to the support post. This is achieved by adding a slight vertical bend in the attachment arms of the cooking platforms, so that when the cooking platform is held by the support post, items held or resting on the cooking platform are held generally level.

A sixth benefit of the invented cooking rack apparatus is that the apparatus is made of materials which are both durable and sturdy. This is especially important where the objects sought to be held by the apparatus are of great weight themselves, for instance a large Dutch oven or a kettle. If a less durable or less sturdy rack were to be used, the sheer weight of the Dutch oven or kettle would cause damage to such a rack. The preferred embodiment of the invented apparatus is made of steel, making it able to support the weight of items such as cast iron Dutch ovens and cast iron kettles.

A seventh benefit of the invented cooking rack apparatus is that placing cooking platforms and grills on the apparatus requires no tools. There are no bolts to tighten or screws to turn. The user merely needs to insert the post into the ground, slide any needed cooking platforms onto the post and insert the kettle hook into the kettle hook opening. Taking the cooking rack apparatus down is just as simple.

BRIEF DESCRIPTION OF THE DRAWINGS

FIGS. 7A–7C are top views of invented cooking platforms.

FIG. 7D is a top view of another invented cooking platform showing an optional cooking rack grill which attaches to the cooking platform.

DESCRIPTION OF THE PREFERRED EMBODIMENTS

The present invention is an outdoor cooking rack apparatus for the support of grills, pots, kettles and other cooking utensils above a campfire. In this application, "distal" means away from the support post 10 and "proximal" means towards the support post 10.

Figure 1:
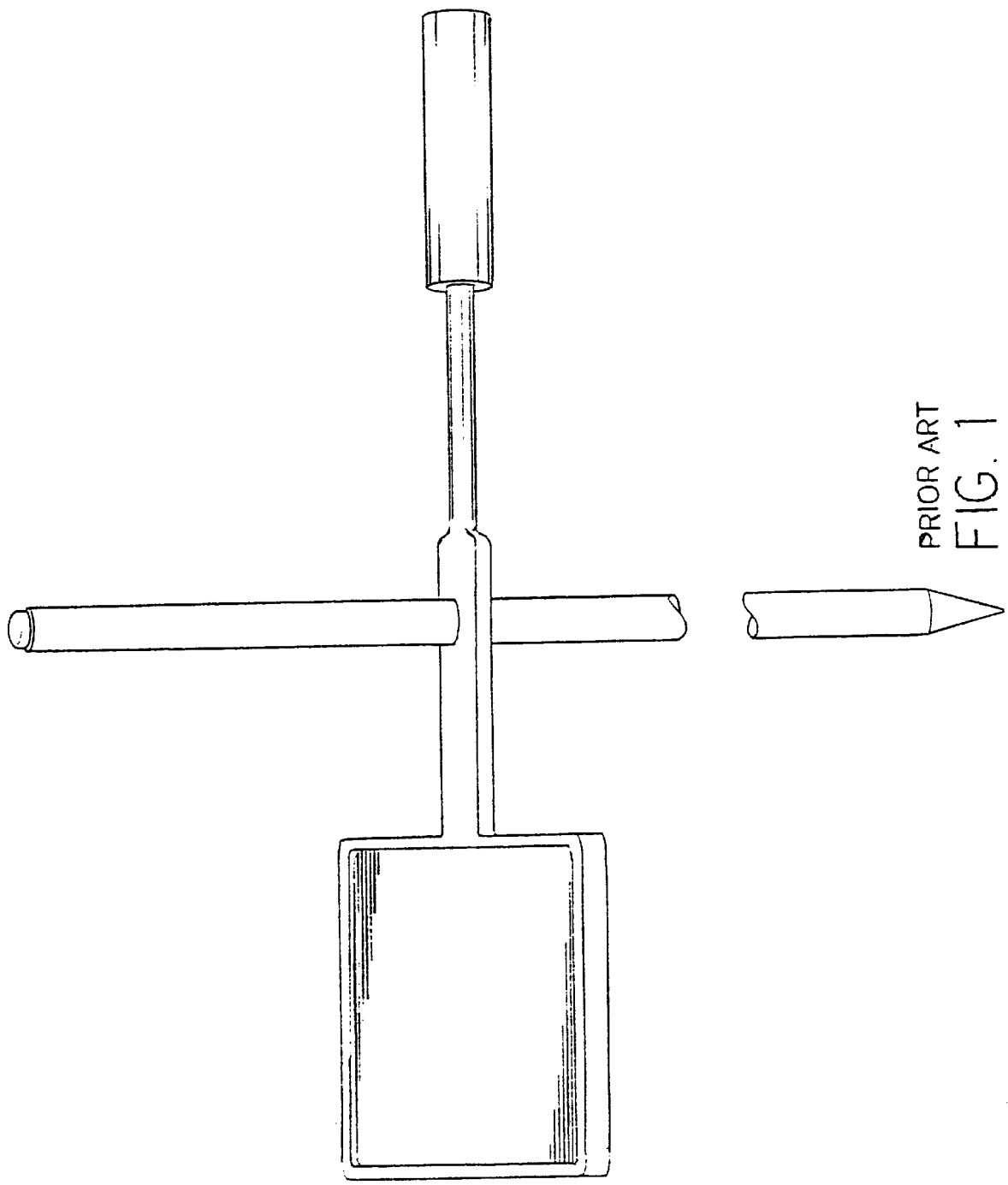
FIG. 1 is a side, partial view of an article of PRIOR ART disclosed to the Applicant and the Applicant's attorney.
Figure 2:
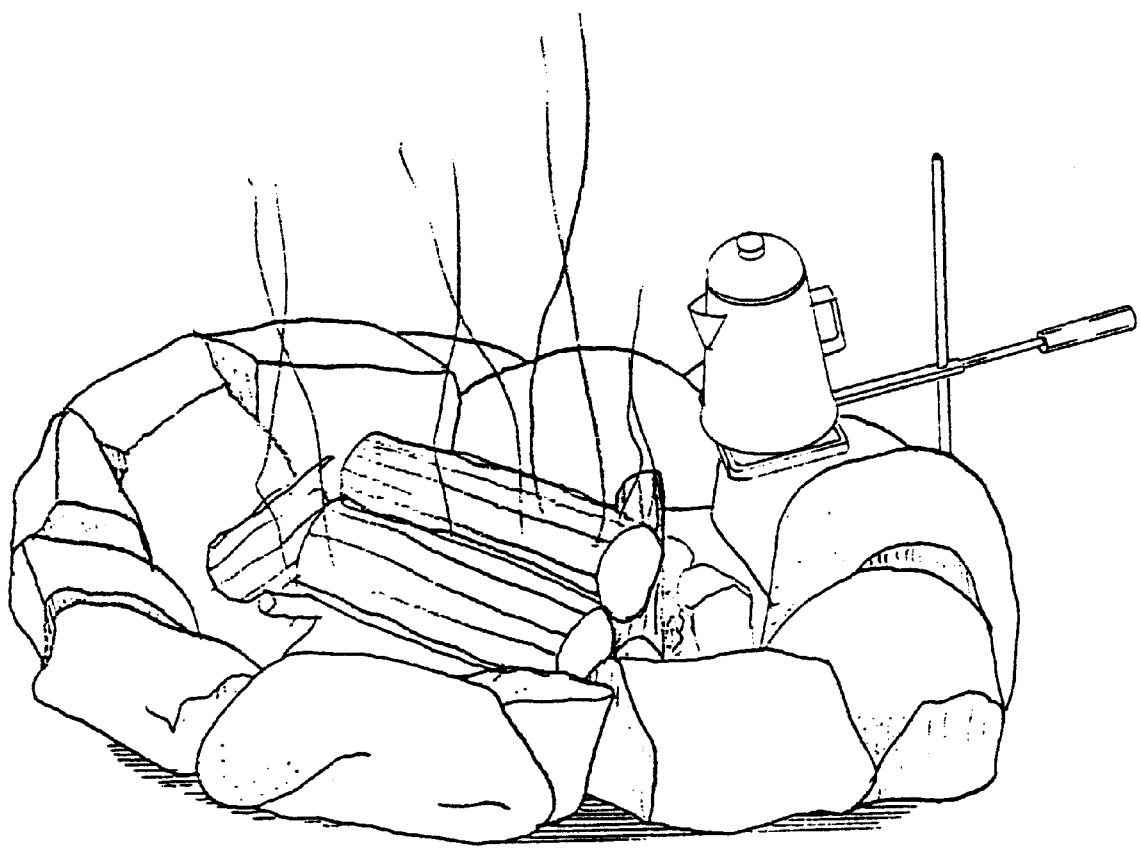
FIG. 2 is a side, perspective view of the article of PRIOR ART, shown in FIG. 1 shown in use, such figure shown in the same general scale as FIG. 3.
Figure 3:
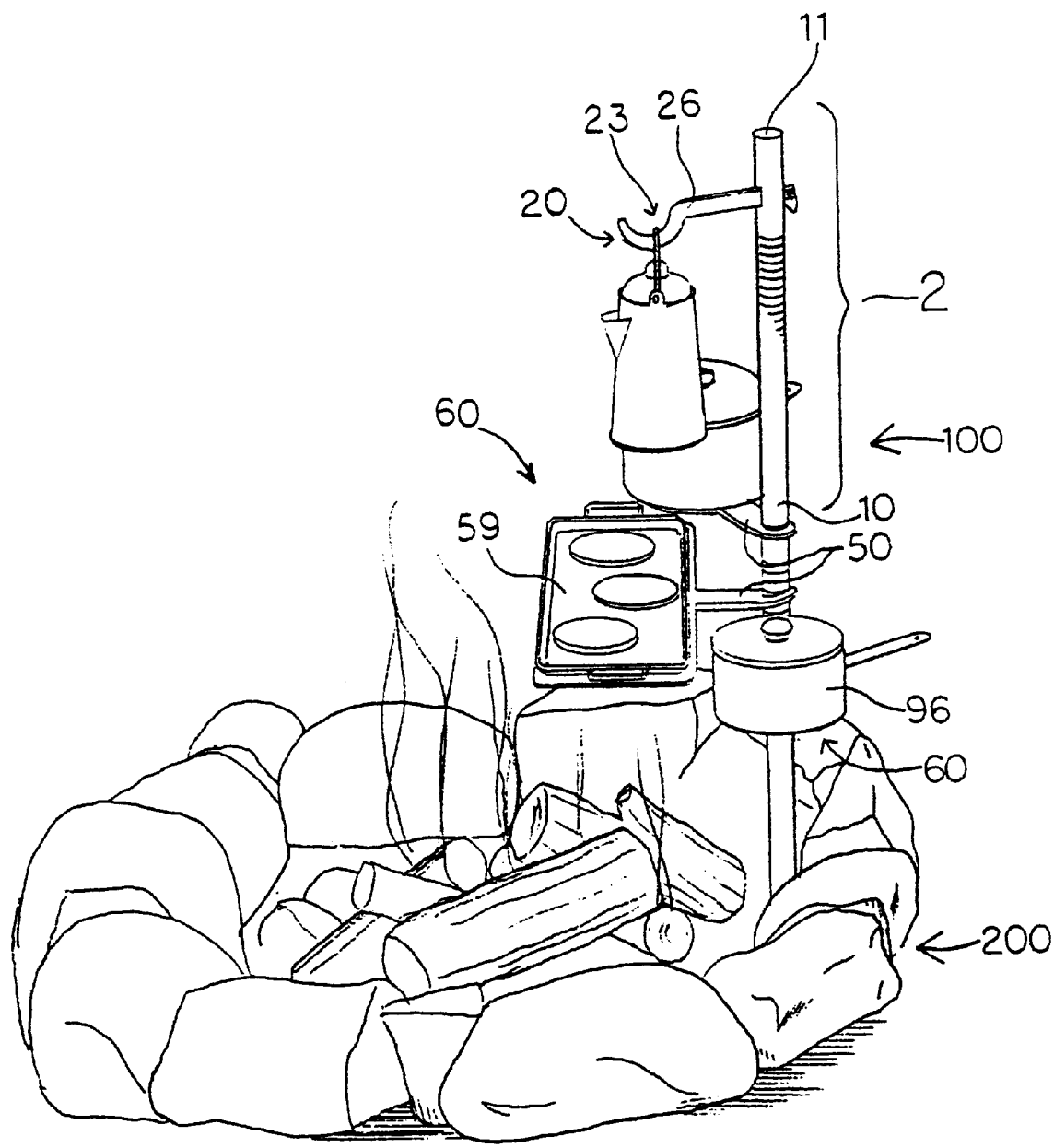
FIG. 3 is a side, perspective view of the invented cooking rack apparatus in use, such figure shown in the same general scale as FIG. 2.

As shown in FIG. 3, the cooking rack apparatus 100 comprises a support post 10 for support of a cooking platform, and a cooking platform 60 for holding a cooking utensil, such as a pot or kettle, over a campfire 200 or other heat source. Additionally, the cooking rack apparatus 100 may comprise a kettle hook 20 for insertion into the upper portion of the cooking rack apparatus 100 for the holding of the handle of a kettle 94 or other item.

The support post 10 comprises a straight rod, having a post top 11 at one end and a post bottom 19 at the opposite end. The support post 10 is inserted into the ground, post bottom 19 end first, generally vertically, preferably inside, or within a close proximity, to a campfire 200. As such, the support post 10 is located generally perpendicular to the ground surface. Such insertion can be done any number of ways, including: digging a hole, inserting the post 10 into the hole, and then backfilling the hole. However, the preferred method of insertion of the post 10 into the ground is hammering the post top 11, with a hammer or mallet in order to force the post bottom 19, shown in FIG. 5, into the ground. Preferably, the post bottom 19, is slightly sharpened into a ground insertion spike 17 for easier insertion into the ground. While the invented support post 10 may be made of any suitable material, it is envisioned by the Applicant that the best mode for the support post 10 is a steel rod of 0.875 inch diameter and 46.0 inches long. Applicant also envisions that the support post 10 may have a base that allows the invented device to be used without insertion of the support post 10 into the ground. Such a base would allow the support post 10 to be generally perpendicular to the surface of the ground.

Figure 4:
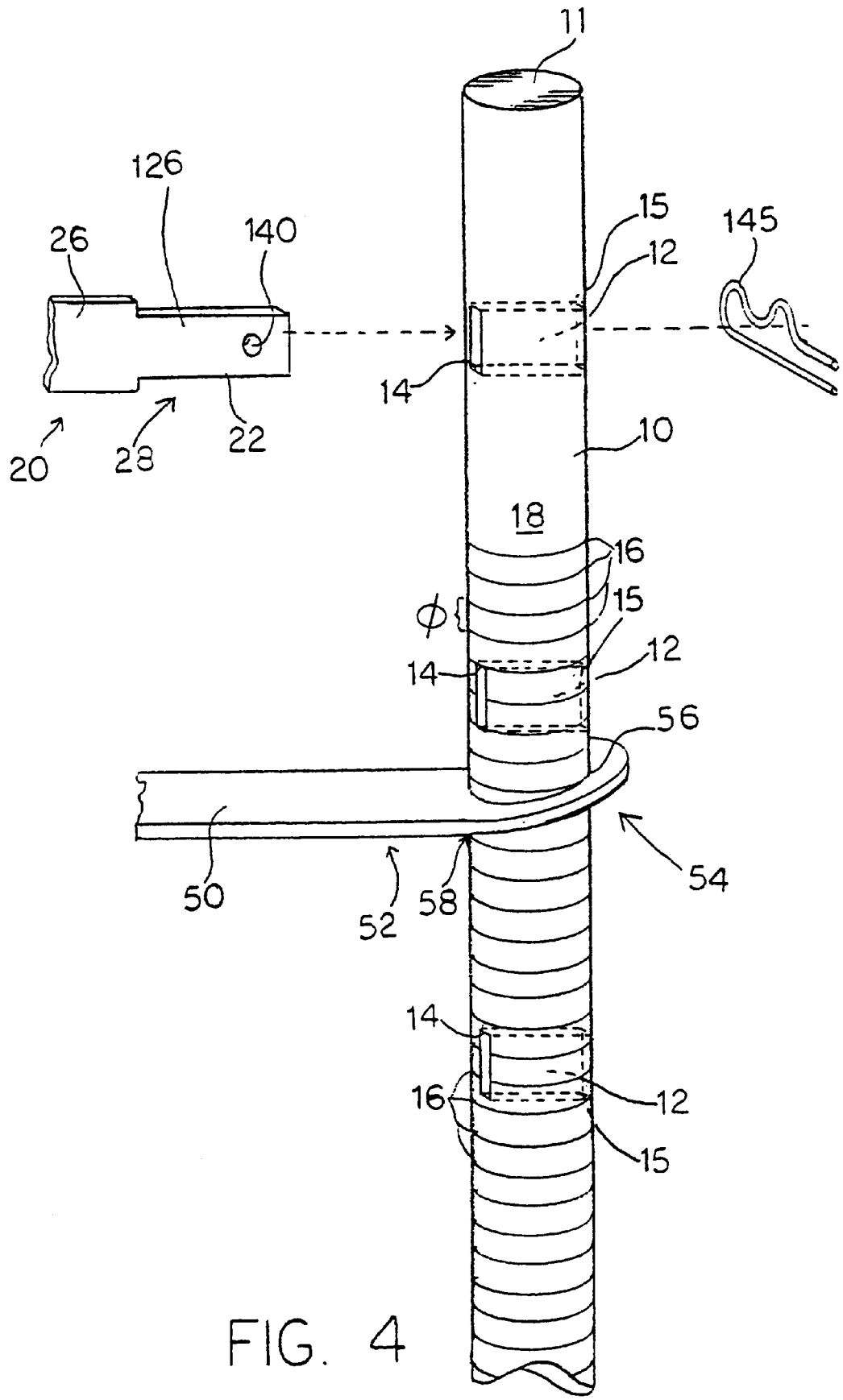
FIG. 4 is a partial, side, perspective view of the upper portion of the apparatus shown in FIG. 3.

Referring to FIG. 4, preferably at least a portion of the support post 10 contains platform supports 16. Such platform supports 16 preferably comprise circular groves around the post 10, but may comprise a series of semi-circular grooves located on opposite sides of the post 10, or even a set of notches located on opposite sides of the post 10. The distance f between the grooves 16, as shown in FIG. 4, is preferably 0.25 inches, but other distances are envisioned, such distance preferably far enough apart so that both the upper rim 56 and the lower rim 58 of the cooking platform's 60 post insertion hole 57 can be simultaneously received in adjacent or nearly adjacent grooves 16. This upper rim 56 and lower rim 58 interaction with the grooves 16 is described further infra. While the support grooves 16 may be of any depth and breadth, it is envisioned by the Applicant that the grooves 16 will be less than 0.0625 inches deep and less than 0.0625 inches wide. It is also envisioned that the grooves 16 will be engraved into the post 10, either through the use of a metal lathe or other abrasive tool, possibly through knurling.

The campfire 200 can be made any number of ways, depending on the user's wishes and circumstances. The campfire 200 shown in FIG. 3 comprises burning fuel, such as wood, within a fire ring, such as the rocks shown. The inventor also discloses an optional firebox stand 62 for holding a firebox 92 containing a burning fuel source, such as wood, which is described infra and shown in FIG. 6. Alternatively, the campfire 200 may be any heat source. Preferably, the heat source is larger than the size of the cooking platforms 60 being used above it.

Figure 8:
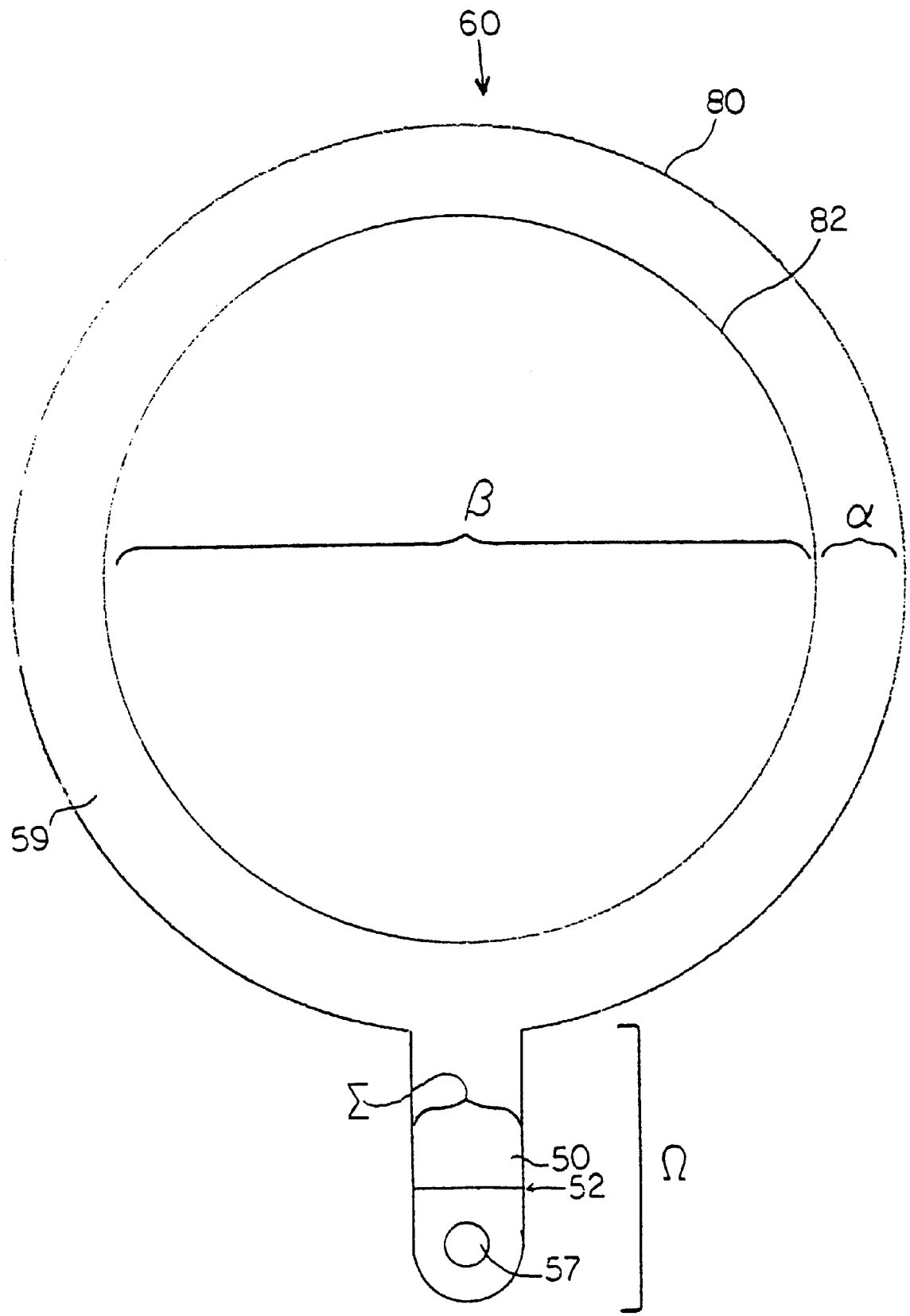
FIG. 8 is a top, detail view of one embodiment of the invented cooking platform.

Referring again to FIG. 3, a plurality cooking platforms 60 are shown adjustably attached to the support post 10. As shown in FIG. 8, a cooking platform 60 comprises: a holding portion 59 for holding a pot or other cooking utensil, said holding portion 59 defined by a width a extending between an exterior circumference 80 and an inner circumference 82; an attachment arm 50 extending within the same general plane as the holding portion 59 from one end of the holding portion 59, said attachment arm 50 defined by a width S and a length W, said attachment arm 50 further comprising support attachment 54. The attachment arm 50 is for attaching the cooking platform 60 to the support post 10. Said support attachment 54 further comprising a leveling bend 52 and a post insertion hole 57. The platforms 60 also have an interior diameter b. The actual diameter b of the interior of the platform 60 will be determined by the size of the pot or other instrument the user wishes to hold upon or within the platform 60. Although differing materials and sizes are also envisioned, the Applicant believes that the best mode will be platforms 60 stamped from steel plating of a 0.25 inch thickness having a width a of between 0.75 inch and 1.0 inch.

The post insertion hole 57, shown in FIG. 8, comprises a circular hole through the attachment arm 50 having an inside diameter of which is slightly larger than the outside diameter of the support post 10. The post insertion hole 57 is preferably located near the end of the attachment arm 50 opposite the attachment with the holding portion 59.

Figure 5:
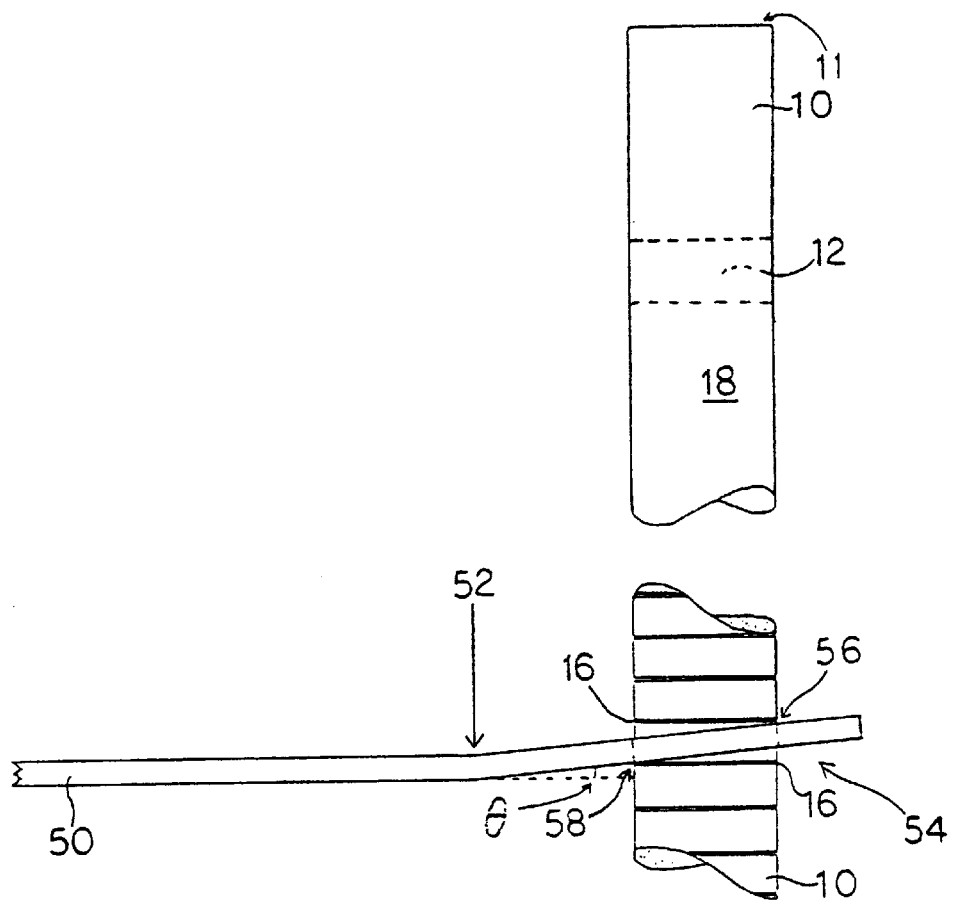
FIG. 5 is a partial, side, perspective view of the apparatus shown in FIG. 3.
Figure 5:
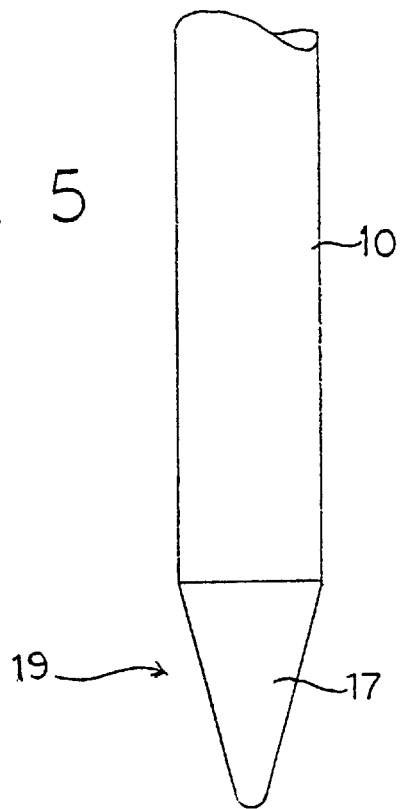

The platforms 60 are attached to the post 10 by sliding the platforms 60, one at a time, over the post top 11, shown in FIG. 4, or alternatively, the post bottom 19, as shown in FIG. 5. These platforms 60 are then slid down from the post top 11, or up from the ground insertion spike 17, depending on which end of the post 10 the platforms 60 are slid onto.

In use, a pot or kettle is preferably placed upon the upper surface of the platform 60, however the pot may also be set through the top of the platform so that the platform 60 surrounds the pot.

The platforms 60 are slid on the post 10 to their desired location. No tools are needed to attach the platforms 60 to the post 10. When the user releases his or her grasp of the platform 60, the platform remains in place on the post 10 due to a support attachment 54. The inventor also envisions that the user may need to use an insulated pot holder, a pair of pliers or other device to assist in the grasping of the platform 60, due to the fact that the platform 60 may become hot due to the heat source 200. Such a device may be included with the rack apparatus 100. The support attachment 54 comprises a post insertion hole 57 surrounding and in at least partial contact with a post surface 18. The upper rim 56 is the top, interior rim of the rear side (the side of the post insertion hole 57 furthest from the pot holding portion 59 of the platform 60, as shown in FIGS. 7A–7D) of the post insertion hole 57. The lower rim 58 is the bottom, interior rim of the front side (the side of the post insertion hole 57 furthest from the pot holding portion 59 of the platform 60, as shown in FIGS. 7A–7D) of the post insertion hole 57.

As the user releases his or her grasp on the platform 60, the cooking platform 60 pivots at its attachment with the post 10, the distal end of the platform 60 moves downward, the upper rim 56 moves upward and comes into contact with the post surface 18, and the lower rim 58 moves downward and comes into contact with the post surface 18. This contact with the post surface 18 causes the rim 56, 58 to slightly bite into the post surface 18 and thereby grasp the post surface 18 tightly. The larger the cooking platform 60 or the object being held within or upon the cooking platform 60, such as the griddle 95 or the small pot 96 shown in FIG. 3, the harder the platforms 60, bite into the post surface 18 due to the effect of gravity pulling the weight of the platform 60 downward.

Preferably, as shown in FIG. 5 and mentioned supra, the post surface 18 has small support grooves 16 for receiving the upper rim 56 and the lower rim 58 of the attachment arm 50. It is also envisioned by the inventor that other means may be used for support in place of the support grooves, for instance the use of a spiral support grove, the use of horizontal beads upon the surface of the post 18 or cross-cut groves cut through knurling. If the post surface 18 has support grooves 16, one or both the upper rim 56 and the lower rim 58 bite into support grooves 16, thereby creating an even more secure attachment. As the user releases his or her grasp on the platform 60, the cooking platform 60 pivots generally vertically at its attachment with the post 10, the distal end of the platform moves downward, the upper rim 56 moves upward and bites into an upper support groove 16, and the lower rim 58 moves downward and bites into the lower support groove 16.

As shown in FIG. 5, the cooking platform 60 attachment arm 50 preferably has a slight leveling bend 52, serving to keep the cooking platform 60 in a generally horizontal or level position. For instance, this bend 52 keeps the pot 96, shown in FIG. 3, or other item being held by the platform within a level position, thereby reducing the number of spills and making for more uniform cooking or heating of the item being held. This bend 52 is only done as far as needed. Thus, depending on the size of the post 10 and the platform 60, differing degrees of bending may be needed. In the preferred embodiment, this degree of bending Q, as shown in FIG. 5, is one to ten degrees, preferably less than five degrees. Again, the bending is only done to the extent needed to make the cooking platform level and within a horizontal plane while in use. This bending could be at a particular point on the attachment arm 50, as is shown in the preferred embodiment as the bend 52 in FIG. 5, or the bending could be a gradual curvature of the attachment arm 50, which is not shown.

Figure 9:
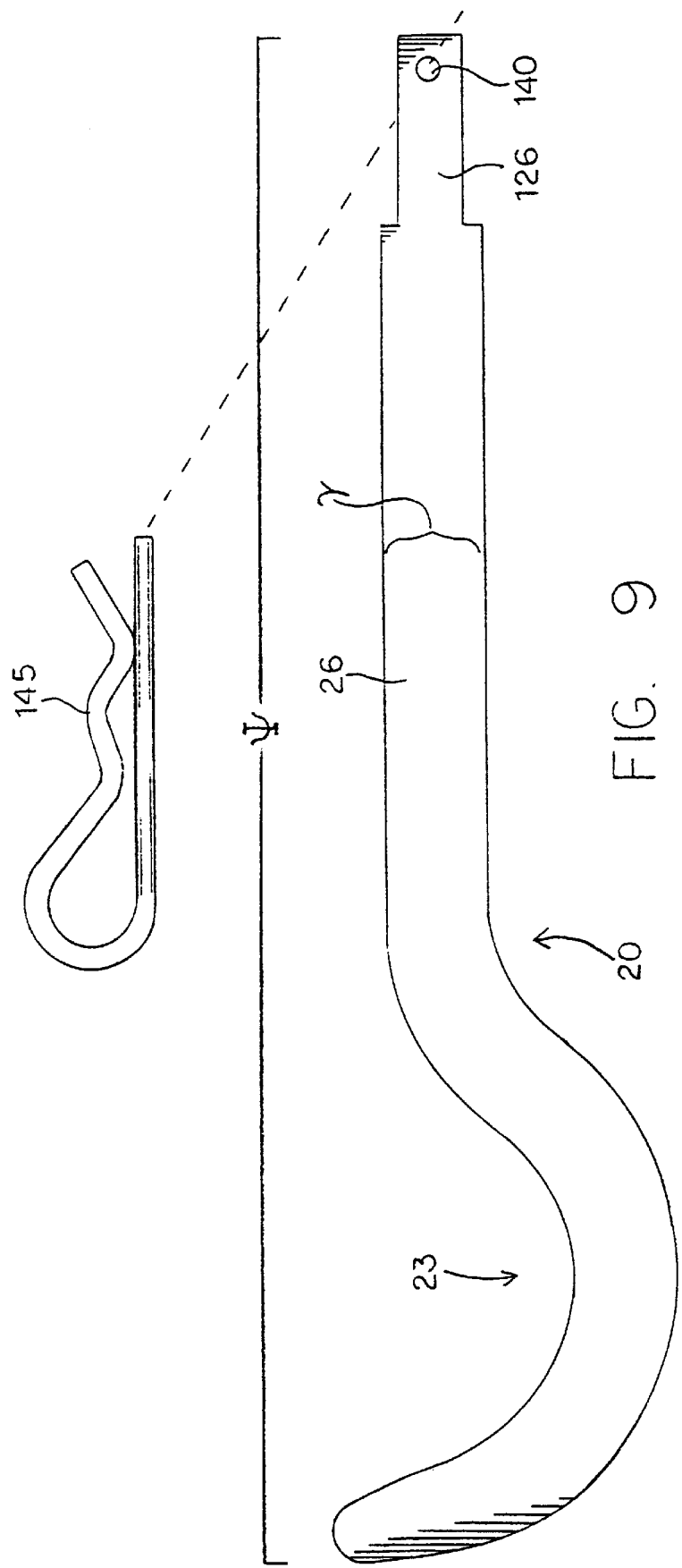
FIG. 9 is a side, detail view of one embodiment of the invented kettle hook, as shown in FIG. 3.
Figure 10:
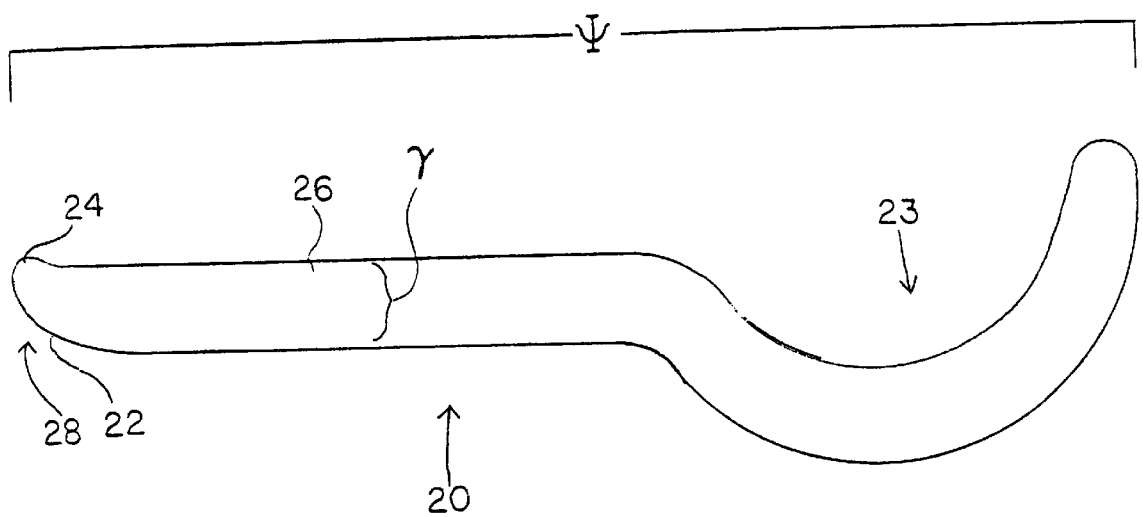
FIG. 10 is a side, detail view of another embodiment of the invented kettle hook.

Referring again to FIG. 3, the support post 10 also preferably has a kettle hook 20 for holding the handle of a kettle 94 or other item, thereby suspending a kettle or other item above the campfire 200. As shown in FIGS. 9 and 10, the kettle hook 20 comprises: a hooked portion 23 for receiving a kettle handle, located at the distal end of the hook 20; a kettle hook arm 26 for the support of a kettle, extending from the hooked portion 23 to a kettle hook attachment 28; and a kettle hook attachment 28 for attachment of a kettle hook 20 to a support post 10. As shown in FIG. 9, the preferred embodiment of the kettle hook attachment 28 comprises the proximal end of the kettle hook arm 26 having a rectangular shaft 126 having an attachment pin hole 140 near the end of the shaft 126. This shaft 126 is then to be inserted into a rectangular kettle hook insertion aperture 12 cut into the post 10. A pin 145 or bolt is then inserted and fastened through the hole 140, thereby fastening the hook 20 to the support post 10. As shown in FIG. 10, the less preferred embodiment is a kettle hook attachment 28 further comprising: a hook lip 24 and an insertion curvature 22.

As shown in FIG. 4, the support post 10 preferably has a kettle hook insertion apertures 12 for receiving the shaft 126 of the kettle hook 20. The aperture 12 is preferably a horizontal channel located within the support post of a height slightly larger than the shaft 126 of the kettle hook arm 26. In the preferred embodiment, the shaft 126 is inserted into a rectangular kettle hook insertion aperture 12 cut into the post. The pin 145 is then inserted into the hole 140, thereby securing the hook 20 to the post 10. In the less preferred embodiment, shown in FIG. 10, the hook lip 24 and the insertion curvature 22 are allowed to enter into the aperture 12 in this manner due to the fact that the hook 20 is curved at the insertion curvature 22 to the hook lip 24 and therefore has a height smaller than the height g, shown in FIG. 9, of the kettle arm 26. Although other sizes, shapes and materials are envisioned, the Applicant believes that the best mode height g of the kettle arm 26 is between 0.5 and 0.75 inches high, the best mode length Y of the kettle hook is between 5 and 15 inches long, and that the best mode material that the kettle hook 20 will be made of is steel plate cut or stamped into the required shape. Preferably, there will be a plurality of kettle hook insertion apertures 12 cut at different heights along the length of the support post 10, thereby allowing the user to place the kettle hook, and kettle, at various heights above the campfire.

In the less preferred embodiment shown in FIG. 10, to attach the kettle hook 20 to the support post 10, the user merely needs to tilt the distal end of the kettle hook 20 slightly upwards, insert the hook lip 24 into the support post aperture front opening 14, maneuver the lip 24 and the curvature 22 through the aperture 12 and out support post aperture rear opening 15. When the lip 24 exits the rear opening 15, then the user can tilt the distal end of the kettle hook 20 back downwards, thereby allowing the kettle hook 20 to return to a horizontal and level position. The kettle hook 20 is thus securely attached to the support post 10. Due to the fact that as long as the kettle hook 20 is within this level position, the kettle hook 20 cannot be slid out of the aperture 12 because the lip 24 inhibits any further proximal movement of the hooked portion 23. This inhibition of the lip 24 is due to the lip 24 being stopped from further proximal movement in the direction of the hooked portion 23 by the contact of the lip 24 with the upper surface of the rear opening 15. Other kettle hook attachments are also envisioned, including a post insertion hole 57 type attachment disclosed above for the cooking platforms 60.

Figure 6:
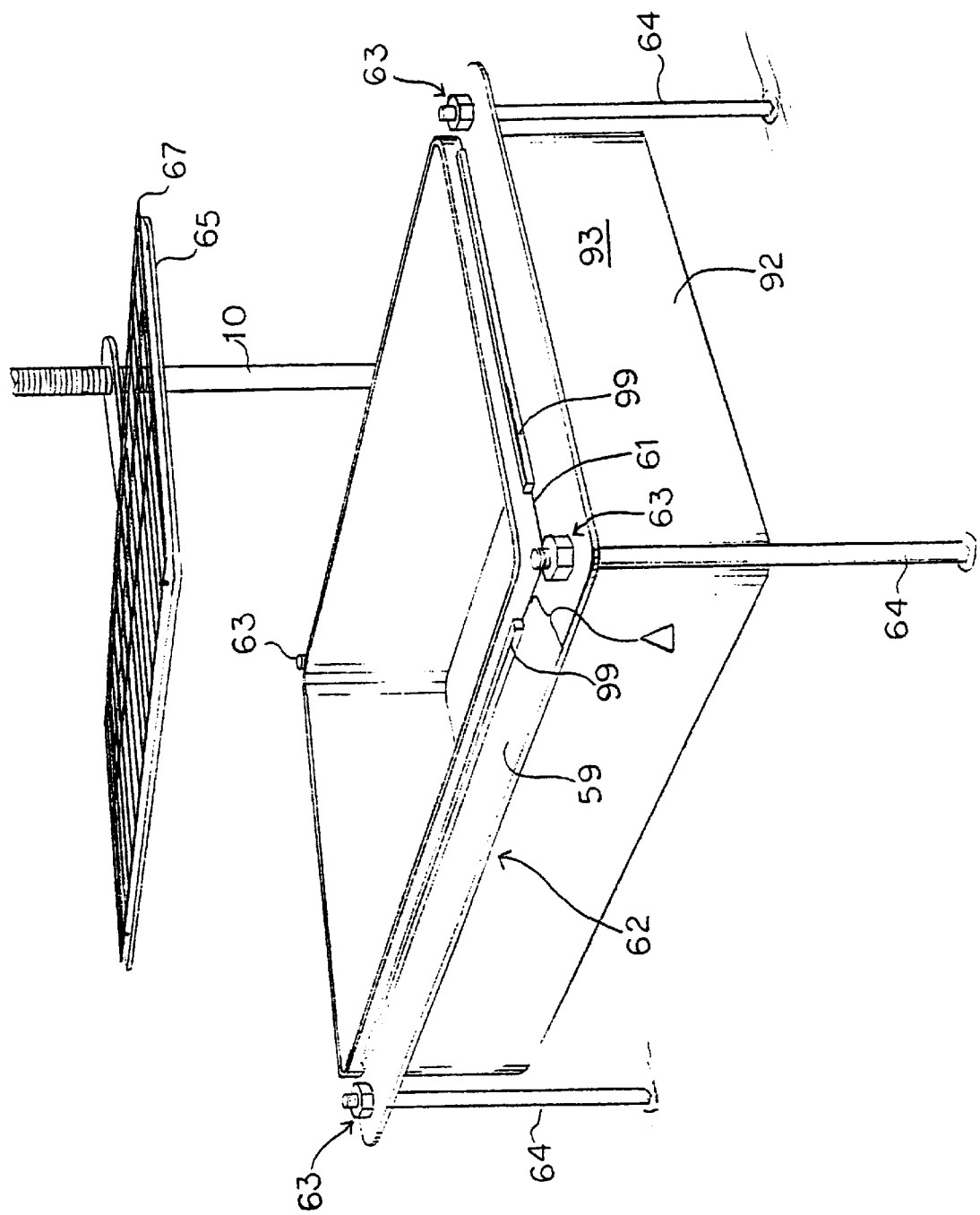
FIG. 6 is a side, perspective view of one embodiment of the invented apparatus including a cooking rack grill held above a firebox resting within a firebox stand.
Figure 7E:
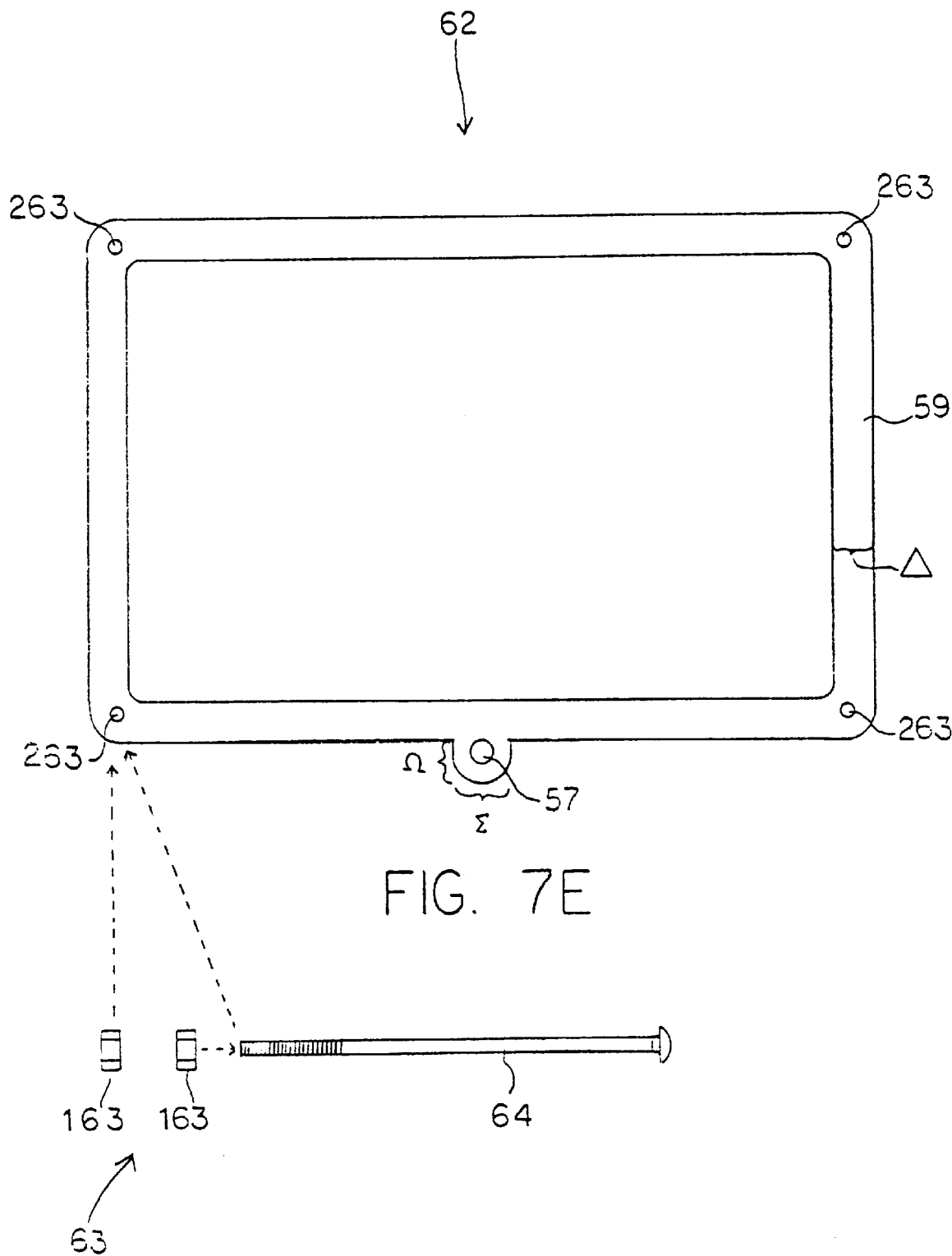
FIG. 7E is a top, perspective view of one embodiment of the firebox stand attachment.

As mentioned earlier, FIG. 6 shows a firebox 92 and a firebox stand attachment 62 for the invented device 100. FIG. 7E further shows the firebox stand attachment 62 and FIG. 7F further shows the firebox 92. The firebox 92 is a basin for containment of a fire, similar to those commonly used in the market as a camping firebox. The firebox stand 62 is used so as to elevate the firebox 92, above the surface of the ground in order to keep the grass or other ground cover from becoming scorched by heat radiating downward from the firebox 92. Preferably, the firebox 92 is of a length and width larger in area than the width and length of the platforms 60 attached to the post 10. The firebox 92 needs only to be of a size and shape sufficient to be received into a platform 60, in this case a firebox stand 62.

Preferably, the firebox 92 is rectangular in shape and able to securely fit within the invented firebox stand 62. Such fit is preferably assisted by a lip 99 located on the outside surface of the firebox 93. Both the firebox 92 and the firebox stand attachment 62 may be of any size and shape and made of any sturdy material. However, it is envisioned by the Applicant that the best mode will be a firebox 92 of aluminum and a firebox stand attachment 62 of steel, said firebox stand attachment 62 preferably stamped from steel plating of a 0.25 inch thickness having a width D, shown in FIG. 7E, of between 1.0 and 1.5 inches, where the firebox stand 62 is shaped so as to receive a firebox approximately: 22.0 inches long, 14.0 inches wide and 4.0 inches deep. Other sized fireboxes 92 and firebox stands 62 are envisioned.

Figure 7F:
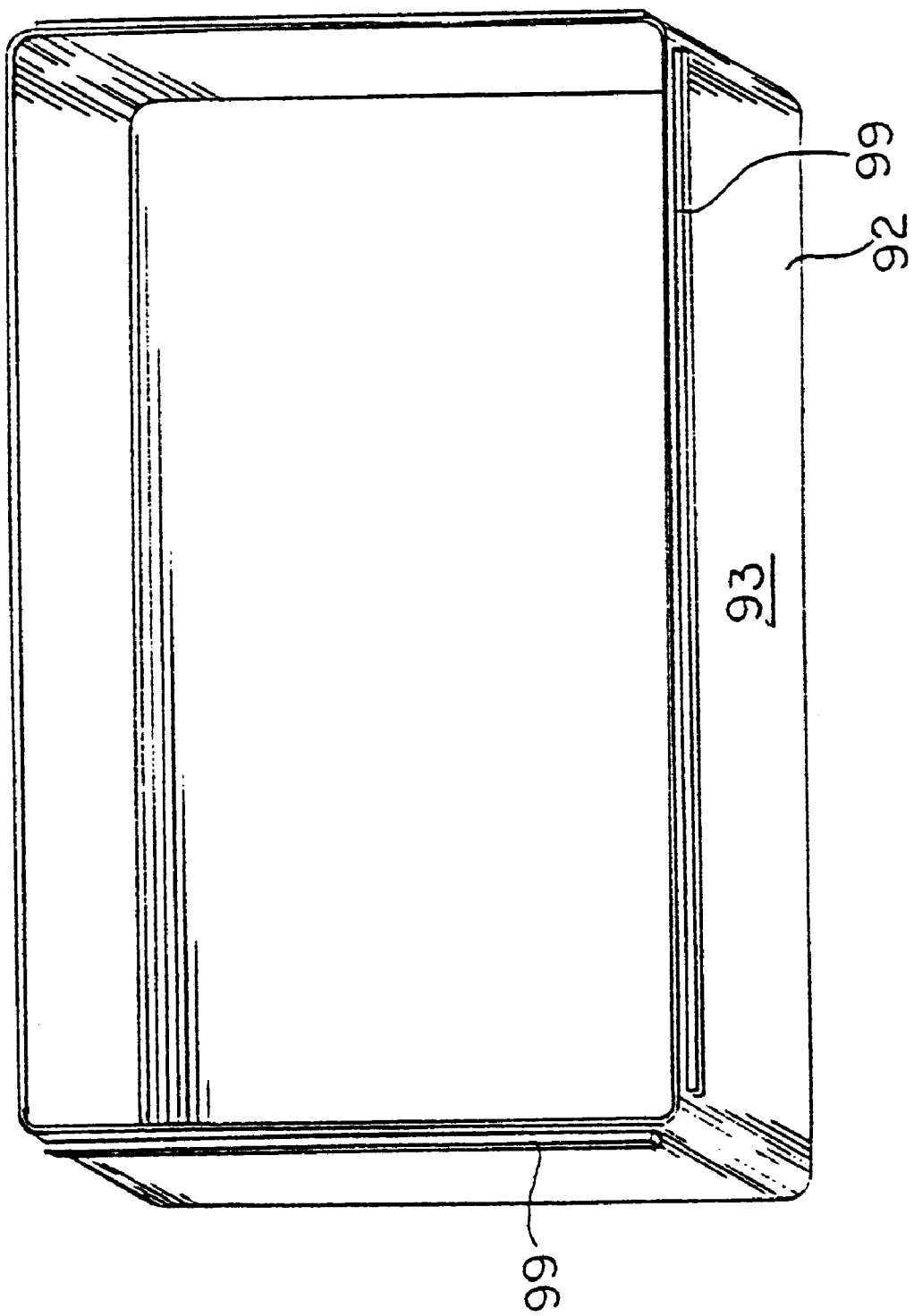
FIG. 7F is a top, perspective view of one embodiment of a firebox.

The invented firebox stand 62 comprises a holding portion 59, connected to an attachment arm 50, not shown, said attachment arm 50 attaching to a support post 10 in the manner described supra, said holding portion 59 having a plurality of leg attachments 63 for attaching a plurality of legs 64 to said holding portion 59. Preferably the number of legs 64 and leg attachments 63 is four, said leg attachments 63 and legs 64 located on the distal corners of the holding portion 59, as shown in FIG. 6. Preferably the holding portion 59 is rectangular for receiving a rectangular firebox 92. The invented firebox stand 62, has an internal brim 61 for contact with and cooperation with a firebox outer surface 93. As shown in FIGS. 7E and 7F, preferably the width S of the firebox stand 62 attachment arm 50 is 1.50 inches and the length W of the attachment arm 50 is less than 3.00 inches.

The leg attachment 63 can be of any common to manufacturing, from a weld to a threaded hole for receiving a threaded end of a leg 64, as shown in FIG. 7E. Preferably, the leg attachment is adjustable and the leg attachments are removable, such features preferred for its ease and compactness of storage. As such, in the preferred embodiment the legs 64 are attached to the leg attachment 63 by threading the threaded end of the legs 64 individually into the threaded holes of the leg attachment 63. In the preferred embodiment, the leg attachment 63 comprises a pair of nuts 163 for attaching a threaded leg 64 to the holding portion 59 at an attachment hole 263.

Figure 11:
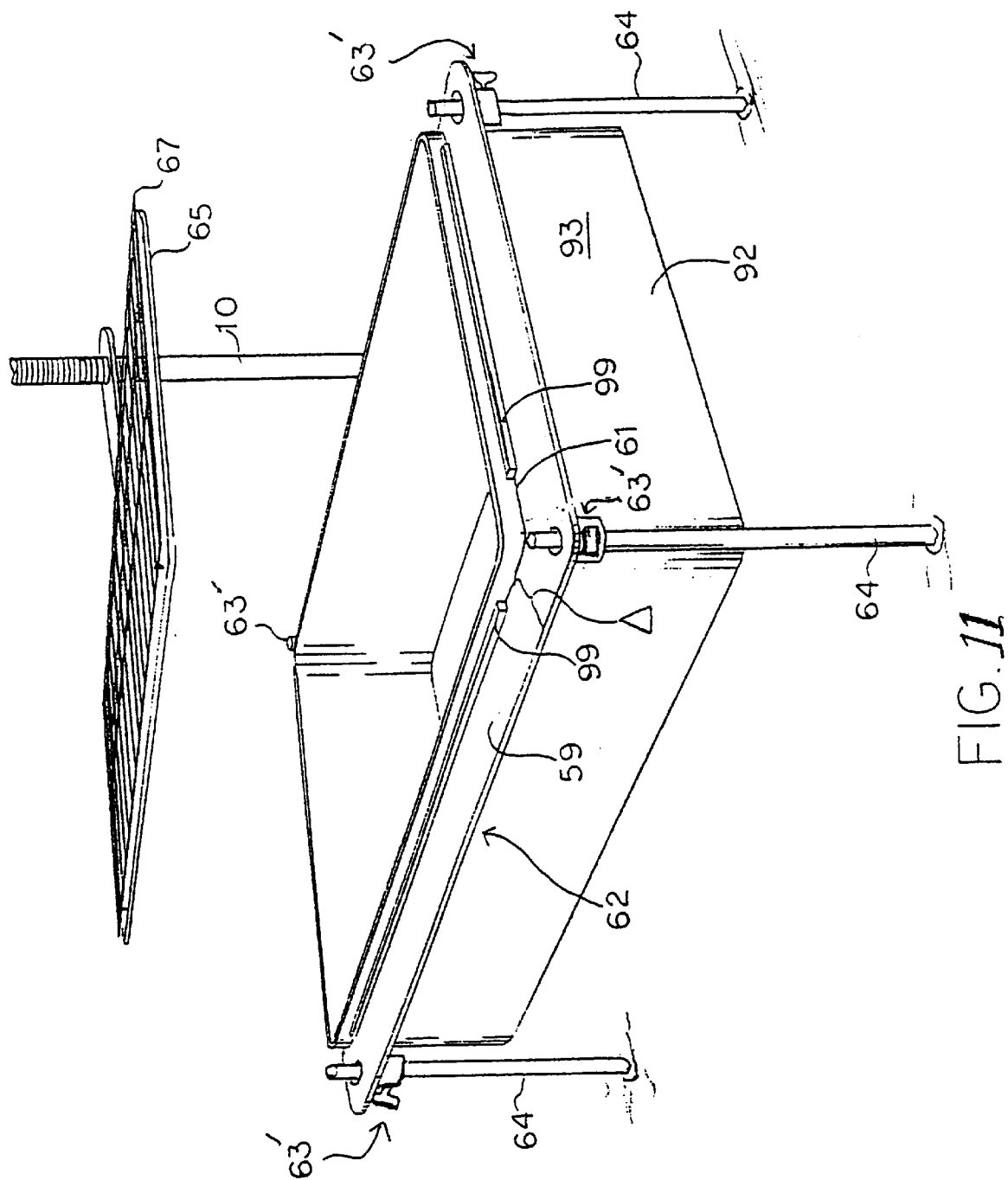
FIG. 11 is a side, perspective view of another embodiment of the invented apparatus including a cooking rack grill held above a firebox resting within a firebox stand, wherein the leg attachments include slidable collars on each leg.

The inventor also envisions the use of other forms of legs 64 and leg attachments, for example, versions in which the holding portion 59 is not actually attached to the legs, but rests on the legs. For example, as shown in FIG. 11, the leg attachment 63' may comprise the legs 64 sliding up and down through holes in the holding portion 59 and a slidable collar retained, with a winged set screw, below the holding portion 59 at any desired position on the leg. This way, the collars on the four legs may be set at differing elevations above the ground, in order to level the holding portion 59 and the firebox 92. Also, with this embodiment, the holding portion 59 and firebox 92 may be easily lifted up off the legs, that is, disconnected from the legs without nuts and bolts and without use of tools. In this embodiment, dirt or rust do not tend to interfere with good operation, as they might with a threaded leg system.

Another embodiment would entail a leg attachment comprising sleeves mounted on the firebox stand 62, said sleeves for receiving the legs. Preferably, the sleeves would be closed at their upper ends. An additional wing nut set screw or other holding means could be used to hold the leg in place at varying elevations within the leg attachment sleeve. Such an attachment would allow legs to be inserted into the leg attachment sleeve and held without the use of a nut or other holding means.

The invented legs 64 are preferably of a length sufficient to keep the firebox 92 inserted within the firebox stand 62 elevated above the ground, and will be adjustable so as to allow the apparatus 100 to be used on unlevel ground. Preferably the legs 64 will be made of steel, however, other materials are envisioned.

FIG. 7 shows various invented cooking platforms and an invented cooking rack 65 with a detachable cooking grate 67. FIGS. 7A–7C show that pot platforms 60 of differing sizes are envisioned, sizes to receive and support pots of various sizes. Each of these pot platforms 60 has a circular pot holding portion 59 for holding the exterior surface of a pot. Platforms 60 of shapes other than circular are also envisioned. The holding portion 59 of each of these platforms 60 individually attaches to a attachment arm 50 having post insertion holes 57. While other sizes, shapes and materials are envisioned, the Applicant believes that the best mode is platforms 60 stamped from steel plating of a 0.25 inch thickness having a width a of between 0.75 inch and 1.0 inch, as shown in FIG. 8.

FIG. 7D shows a cooking rack platform 65. This cooking rack platform 65 also has a holding portion 59 attached to an attachment arm 50 having a post insertion hole 57. The cooking rack platform 65 also has a cooking rack grill 67 attaching to the top side of the cooking rack platform 65 through the cooperation of pins 165 located on the grill 67 and pin holes 160 located on the platform 65. This cooking rack grill 67 gives the rack platform 65 a surface ideal for the grilling of food items, such as fish or vegetables. Preferably the grill 67 is removable so that the grill 67 can be easily cleaned, but attached grills are also envisioned. While other sizes, shapes and materials are envisioned, the Applicants believes that the best mode comprises a cooking rack platform 65 stamped from steel plating of a 0.25 inch thickness having a width m of between 0.75 inch and 1.0 inch.

It is envisioned by the inventor that the present invention will be able to be carried to a campsite either within a backpack or unloaded from a nearby vehicle and then carried to the campsite.

One of the important benefits of the present invention is the ability to have particular cooking platforms 60 moved away from directly above the campfire, while other cooking platforms 60 are allowed to stay in place above the campfire. For instance, if the user is cooking dinner in a Dutch oven and coffee in a coffee pot, when the coffee has brewed, the user can rotate or swivel the platform 60 the coffee pot is resting upon away from the fire so that the coffee will not burn. Such swiveling is within a generally horizontal plane. The coffee pot can even be left partially above the campfire to keep the coffee hot. The user can also move individual cooking platforms upward or downward within a generally vertical plane. Depending on the height from the fire and the degree that the platform 60 is placed directly above the fire, the user can adjust the temperature of the heat supplied to the pot or kettle.

It is envisioned by the inventor that the present invention will be packaged together as a set: a support post, a kettle hook, a set of different sized cooking platforms, a cooking platform for holding a griddle and/or a grill, a grill, a firebox platform, and a firebox.

Although this invention has been described above with reference to particular means, materials and embodiments, it is to be understood that the invention is not limited to these disclosed particulars, but extends instead to all equivalents within the scope of the following claims.

I claim:

1. An outdoor cooking rack apparatus, comprising:
    a support post for the support of a cooking platform, said support post comprising a generally straight rod having a post top and a post bottom, wherein said support post further comprises a plurality of platform supports upon said support post; and
    a cooking platform for holding a cooking utensil over a campfire, said cooking platform adjustably attached to said support post, said cooking platform able to be moved upward or downward within a vertical plane, and said cooking platform able to be swivelled within a horizontal plane;
    wherein said platform supports further comprise generally horizontal grooves.

2. An outdoor cooking rack apparatus as in claim 1, further comprising a kettle hook for the holding of the handle of a kettle or other item, said kettle hook able to be inserted into and attached to an upper portion of the support post.

3. An outdoor cooking rack apparatus, comprising:
    a support post for the support of a cooking platform, said support post comprising a generally straight rod having a post top and a post bottom, wherein said support post further comprises a plurality of platform supports upon said support post; and
    a cooking platform for holding a cooking utensil over a campfire, said cooking platform adjustably attached to said support post, said cooking platform able to be moved upward or downward within a vertical plane, and said cooking platform able to be swivelled within a horizontal plane; wherein said cooking platform comprises:
        a holding portion for holding a pot or other cooking utensil;
        an attachment arm attached to the holding portion; and,
        a support attachment connected to the attachment arm for connecting said cooking platform to said support post, said support attachment comprising a post insertion hole for receiving said support post, wherein said support attachment further comprises a leveling bend for keeping said cooking platform in a generally level position.

4. An outdoor cooking rack apparatus as in claim 3, wherein the support attachment further comprises sliding of the post insertion hole over the post top, said post insertion hole having an upper rim and a lower rim which are allowed to bite into said support post.

5. An outdoor cooking rack apparatus as in claim 4, wherein the support post comprises an upper support groove and wherein said upper rim bites into the upper support groove.

6. An outdoor cooking rack apparatus as in claim 4, wherein the support post comprises a lower support groove and wherein said lower rim bites into the lower support groove.

7. An outdoor cooking rack apparatus as in claim 3, wherein the holding portion of the cooking platform is circular.

8. An outdoor cooking rack apparatus as in claim 3, wherein the holding portion of the cooking platform is rectangular.

9. An outdoor cooking rack apparatus as in claim 3, wherein the cooking platform comprises a plurality of legs and a plurality of leg attachments for connecting the legs to said holding portion.

10. An outdoor cooking rack apparatus, comprising:
    a support post for the support of a cooking platform, said support post comprising a generally straight rod having a post top and a post bottom;
    a cooking platform for holding a cooking utensil over a campfire, said cooking platform adjustably attached to said support post, said cooking platform able to be moved upward or downward within a vertical plane, said cooking platform able to be swiveled within a horizontal plane; said cooking platform further comprising:
        a holding portion for holding a pot or other cooking utensil, said holding portion attaching to an attachment arm;
        an attachment arm for attaching said holding portion to said support attachment;
        a support attachment for attaching said cooking platform to said support post; wherein said support attachment further comprises:
            a post insertion hole for attaching said cooking platform to said support post;
            a leveling bend for keeping said cooking platform in a generally level position;
            wherein said support attachment further comprises the sliding of the post insertion hole over the post top, said post insertion hole having an upper rim and a lower rim which are allowed to bite into said support post.

11. An outdoor cooking rack apparatus as in claim 10, wherein the holding portion of the cooking platform is circular.

12. An outdoor cooking rack apparatus as in claim 10, wherein said upper rim bites into an upper support groove.

13. An outdoor cooking rack apparatus as in claim 10, wherein said lower rim bites into a lower support groove.

14. An outdoor cooking rack apparatus as in claim 10, further comprising a kettle hook for the holding of the handle of a kettle or other item, said kettle hook able to be inserted into and attached to the upper portion of the support post.

15. An outdoor cooking rack apparatus as in claim 10, wherein said support post bottom further comprises a ground insertion spike.

16. An outdoor cooking rack apparatus as in claim 10, wherein said support post further comprises a plurality of support grooves circumscribing said support post.

17. An outdoor cooking rack apparatus as in claim 10, wherein the holding portion of the cooking platform is rectangular.

18. An outdoor cooking rack apparatus as in claim 10, wherein the holding portion of the cooking platform comprises a plurality of leg attachments for receiving a plurality of legs and a plurality of legs.

* * * * *